US006625752B1

United States Patent
Kader et al.

(10) Patent No.: US 6,625,752 B1
(45) Date of Patent: Sep. 23, 2003

(54) METHOD FOR IMPROVING SYSTEM AVAILABILITY FOLLOWING THE FAILURE OF THE PROCESSORS OF A PROCESSOR PLATFORM

(75) Inventors: Hans Kader, München (DE); Herbert Karzel, Wessling (DE); Branko Popovic-Berrsche, Geltendorf-Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/600,715

(22) PCT Filed: Jan. 19, 1999

(86) PCT No.: PCT/DE99/00125

§ 371 (c)(1),
(2), (4) Date: Jul. 20, 2000

(87) PCT Pub. No.: WO99/38077

PCT Pub. Date: Jul. 29, 1999

(30) Foreign Application Priority Data

Jan. 20, 1998  (DE) ........................................ 198 01 992

(51) Int. Cl.[7] ............................................... G06F 11/00
(52) U.S. Cl. ......................................... 714/11; 714/10
(58) Field of Search .............................. 714/10, 11, 12, 714/2, 3

(56) References Cited

U.S. PATENT DOCUMENTS

| 4,521,847 A | | 6/1985 | Ziehm et al. | |
|---|---|---|---|---|
| 5,214,652 A | * | 5/1993 | Sutton | 714/10 |
| 5,271,013 A | * | 12/1993 | Gleeson | 714/10 |
| 5,513,354 A | * | 4/1996 | Dwork et al. | 709/106 |
| 5,615,370 A | * | 3/1997 | Nagai | 709/102 |
| 5,649,088 A | * | 7/1997 | Hauck et al. | 714/2 |
| 5,717,849 A | * | 2/1998 | Brady | 714/2 |
| 5,758,051 A | * | 5/1998 | Moreno et al. | 714/2 |
| 5,805,790 A | * | 9/1998 | Nota et al. | 714/10 |
| 5,815,651 A | * | 9/1998 | Litt | 714/10 |
| 5,848,238 A | * | 12/1998 | Shimomura et al. | 714/49 |

FOREIGN PATENT DOCUMENTS

DE      198 01 992        8/1999

OTHER PUBLICATIONS

Erik Maehle, Fehlertolerante Multiprozessor—Topologie, (Fault–Tolerant Multiprocessor Topologies), (1989), pp. 39–49.
R Krishna Kumar, et al., "A Fault–tolerant multi–transputer architecture", vol. 17, No. 2, (1993), pp. 75–81.
R. Cuyvers, et al., "A Modular Multiprocessor Kernel for Automatic Non–Stop Processing", International Journal of Mini & Microcomputers, vol. 14, No. 1, (1992), pp. 9–15.

* cited by examiner

Primary Examiner—Nadeem Iqbal
Assistant Examiner—Timothy M. Bonura
(74) Attorney, Agent, or Firm—Morrison & Foerster LLP

(57) ABSTRACT

The processing of tasks in a processor platform is carried out by distributing the processing procedure over a logical chain of a number of processors in the processor platform. If one of the processors fails, the data is lost and the whole chain remains blocked for a relatively long time. The invention provides a remedy for this by forming a further chain in which significant data relating to state is transferred to the subsequent processor. When restarted, the failed processor can then load this data again and thereby assume a state as before the failure.

4 Claims, 2 Drawing Sheets

METHOD FOR IMPROVING SYSTEM AVAILABILITY FOLLOWING THE FAILURE OF THE PROCESSORS OF A PROCESSOR PLATFORM

BACKGROUND OF THE INVENTION

Contemporary communication systems have a plurality of processors which interact with one another to process particular tasks or subtasks. Such a plurality of processors is also called a processor platform. The platform is administratively defined before the communication system is put into operation.

During operation of the communications system, one of the processors in the processor platform accepts the task to be processed, with data required for this purpose, and carries out a first processing operation. According to the result, a further processor is then driven, to which the result of the first processing operation is then supplied. For its part, this processor then carries out further processing operations and transfers the determined result possibly to a further processor. The processing steps of a subsequent processor thus depend directly on the result of the predecessor. This forms a logical chain generally including a plurality of processors in the processor platform. These processors form a subset of all the processors in the processor platform.

The problem with such an arrangement is that, if only one of the processors in this logical chain fails, the task can no longer be processed. In this case, under some circumstances processing of the task cannot even be terminated, because the task is not recognized as being the particular task if data which is essential for this purpose has been lost during the failure. Also another result is that this logical chain of processors remains blocked for the processing of further tasks.

In the case of the prior art, these failures are handled in a cyclical time frame by starting monitoring programs or audits which examine the processors in a processor platform for hardware and software errors. As a rule, these monitoring and checking operations are carried out at a time when there is little traffic. The fundamental time interval can therefore sometimes take up a very long time. The incorrect response thus remains unnoticed for the duration of this time interval.

The publication "Krishna Kumar R. et al.: "A Fault Tolerant Multi-Transputer Architecture", Microprocessors and Microsystems, vol. 17, No. 2, Jan. 1, 1993, pages 75–81, XP000355542" talks about a method for improving system availability. The configuration mentioned therein has a central control device. This central control device checks and controls a chain formed by a plurality of processors. If one of the processors fails, the central control device takes the failed processor out of operation using a switching network. The processor adjacent to the failed processor then takes on the tasks of the failed processor. This can be done to this extent because the applications being discussed here contain processor-neutral data which can be processed by each of the processors. To this extent, what is involved here is a rigid configuration that cannot be changed at any time to suit the requirements of the tasks to be computed.

SUMMARY OF THE INVENTION

The present invention is based on an object of indicating a way in which the failure of one or more processes in a processor platform can be handled efficiently in order to increase the dynamics of the system.

According to an aspect of the present invention a method for improving system availability after failure of processors in a processor platform includes the steps of processing a prescribed task with one or more of the processors including splitting the prescribed task into one of more subtasks which are each processed on the one or more of the plurality of processors. A first logical chain is formed for a duration of the processing of the prescribed task. Additionally, a second logical chain is formed including all of the plurality of processors in the processor platform. Physical and logical processor data and data describing the current processing state of the prescribed task are transferred from one of the plurality of processors arranged in the second logical chain to a next one of the plurality of processors arranged in the second logical chain. The method further includes loading back at least one of the physical and logical processor data and data describing the current processing state of the prescribed task from the next one of the plurality of processors arranged in the second logical chain to the one of the plurality of processors arranged in the second logical chain when the one of the plurality of processors fails and is restarted.

The particular advantage of the invention is the formation of a further logical chain of processors superimposed on the first logical chain. In this arrangement, significant data from a processor arranged in this chain is transferred to the next processor in this chain. This occurs irrespective of which of the processors in the first logical chain is having the result of the processing transferred to it. This has the associated advantage that, when restarted, a failed processor can load back this significant data directly from the next processor in this chain again and it, thus, has a portrayal of the data as before the failure.

Additional advantages and novel features of the invention will be set forth, in part, in the description that follows and, in part, will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 1 shows, by way of example, 30 processors P1 . . . P30 in a processor platform. For reliability reasons, all the processors are duplicated so that, in the event of one processor failing, a switch can be made to the processor arranged as its redundancy processor, all of said processors being intermeshed via connecting lines. The processors P1, P10, P15, P28 are then intended to process a waiting task, and they thus form a first logical chain (k) shown in FIG. 2) processor platform. The waiting task is to be the setting-up of a connection.

Figure 1:
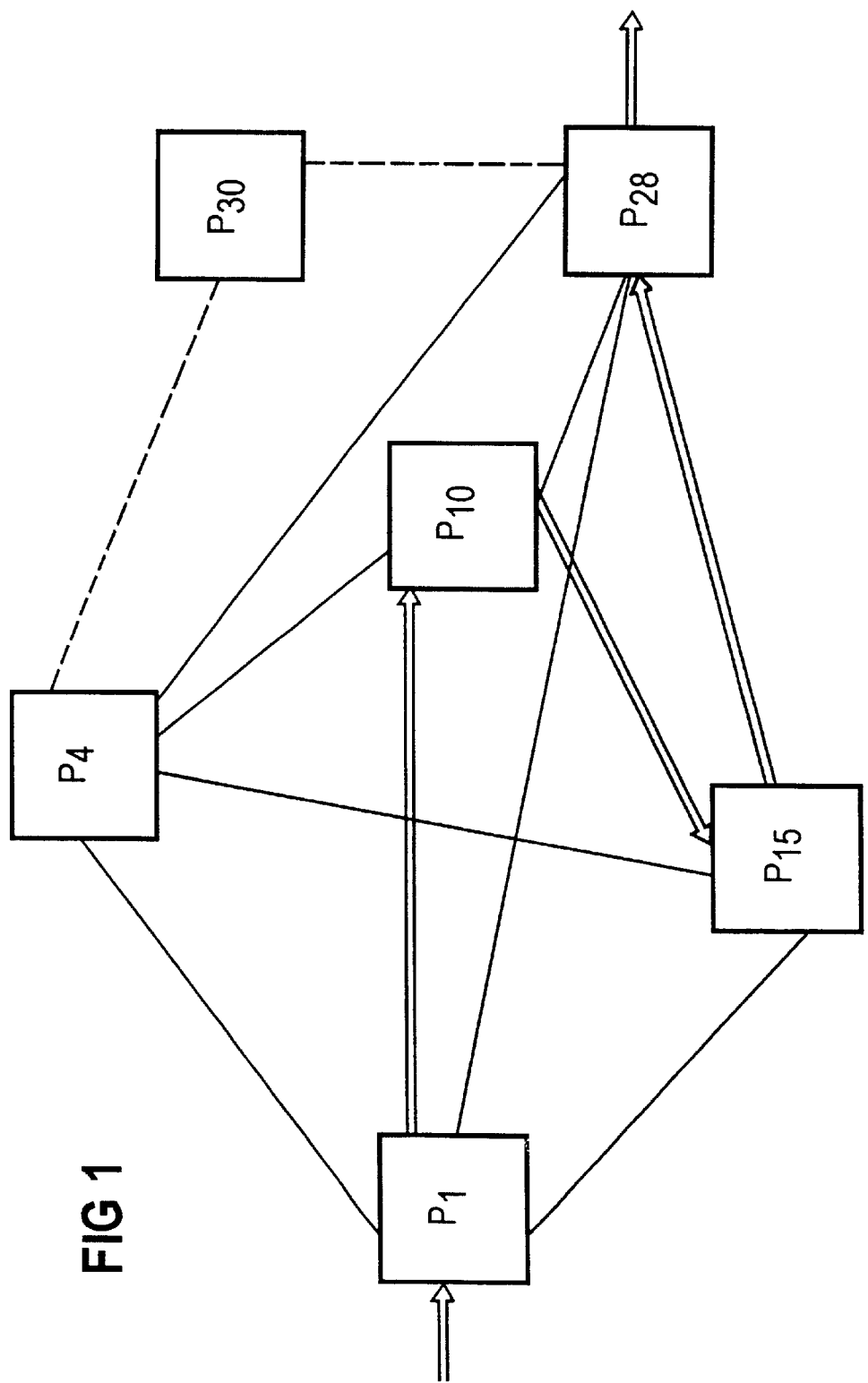
FIG. 1 shows a processor platform having a total of 30 processors.
Figure 2:
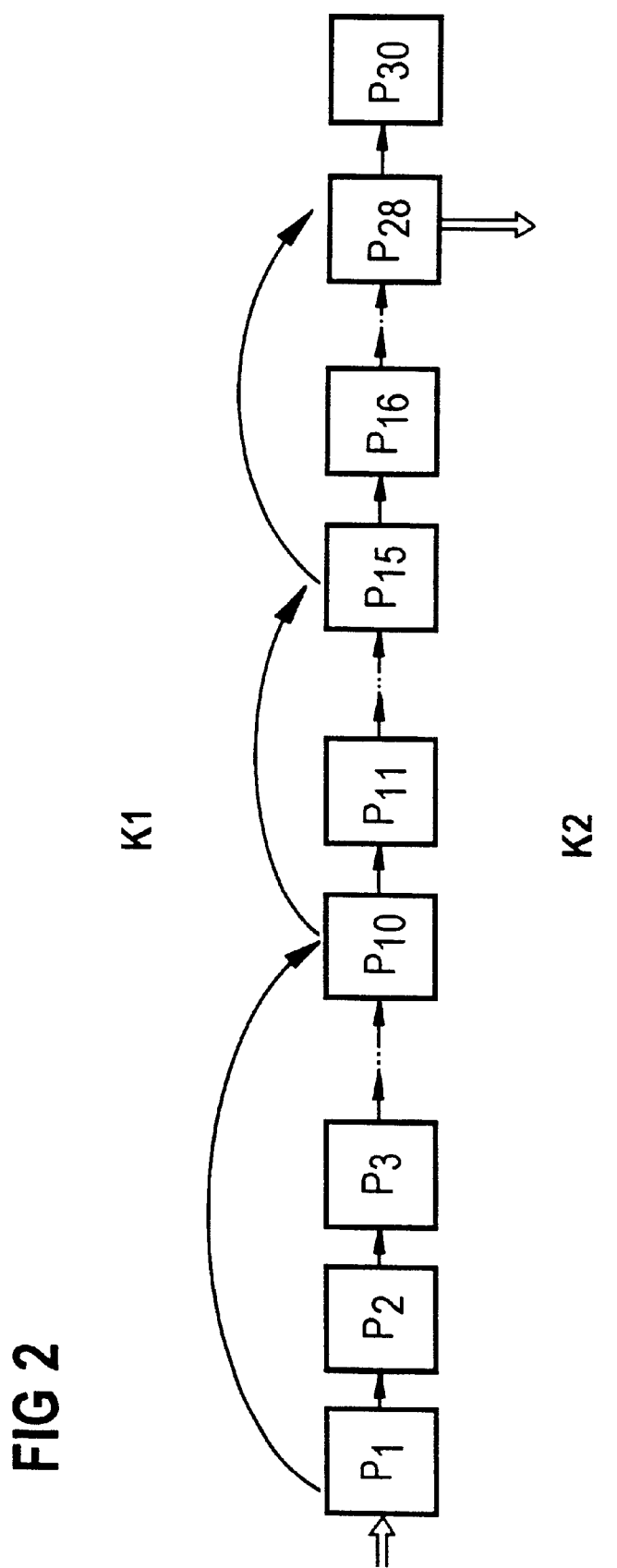
FIG. 2 shows a linear chain of processors.

As FIG. 2 shows, a provision of the invention is that the processors P1 . . . P30 are arranged in a second logical chain K2. According to the present illustrative embodiment, the start of this chain is thus formed by the processor P1. As the further element of this chain, processor P1 is followed by the processor P2, etc. The end of the chain is formed by the processor P30.

According to the present illustrative embodiment, the processor platform is thus intended to have the task of setting up a connection. To this end, this task and data which is necessary for this, are supplied to one of the processors in the first logical chain of processors. By way of example, this is to be processor P1.

The task is split up into subtasks, with each subtask running on one of the processors P10, P15, P28 integrated in the processing procedure. In this arrangement, the subsequent processor in the chain is dependent on the other processors' preprocessing.

The processor P1 now processes the first subtask. According to the result of the processing procedure, the data defining this result is then supplied to the processor P10, which carries out a further processing operation before the data is supplied to the processors P15 and P28 and leaves the chain again.

A provision of the invention is that significant data from the processor P1 is now transmitted to the processor P2 connected downstream in the second logical chain K2. The significant data is intended to be data which represents a representative portrayal of the physical and logical states assumed by the processor P1. Furthermore, the significant data describes the current state of the relevant task currently being processed in the processor P1.

Similarly, the next processors in the second logical chain K2 are supplied with significant data from the processor connected upstream. The processor P11 thus stores significant data from the processor P10, the processor P23 stores significant data from the processor P22 and so on. The significant data can be supplied at the same time as the result is transmitted to the processor connected next in the first logical chain. This mode of procedure is not obligatory, however. A cyclical time interval between the processing procedures is also conceivable in this case. The significant data is deleted again when processing of the task in the subsequent processor has ended.

According to the present illustrative embodiment, it is now assumed that one of the processors fails together with the processor which is arranged as a redundant processor. By way of example, this is to be processor P15. In this case, the data which was just being processed is lost and can no longer be supplied to the processor P28 for further processing.

The processor P15 is now started up again directly after the failure. For this purpose, the significant data supplied to the processor P16 is stored back in the processor P15 again. This means that the knowledge before the failure is then present in the processor P15 again, and processing of the task can be continued. The result obtained is then supplied to the processor P28. Consequently, the gap produced by the failure in the logical first chain K1 is closed again.

While this invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. A method for improving system availability after failure of processors in a processor platform formed by a plurality of processors, the method comprising:
    processing a prescribed task with one or more of the plurality of processors including splitting the prescribed task into one or more subtasks, which are each processes on the one or more of the plurality of processors, wherein a first logical chain is formed for a duration of the processing of the prescribed task;
    transferring physical and logical processor data and data describing a current processing state of the prescribed task from one of the plurality of processors arranged in a second logical chain to a next one of the plurality of processors arranged in the second logical chain, the second logical chain comprising the plurality of processors from the first logical chain; and
    loading back at least one of physical and logical processor data and data describing the current processing state of the prescribed task from the next one of the plurality of processors arranged in the second logical chain to the one of the plurality of processors arranged in the second logical chain when the one of plurality of processors fails and is restarted.

2. The method according to claim 1, further comprising the step of deleting the physical and logical processor data and the data describing the current processing state of the prescribed task in one of the plurality of processors in the second logical chain when processing of the prescribed task has ended in the next one of the plurality of processors in the second logical chain.

3. A method for improving system availability after failure of processors in a processor platform formed by a plurality of processors, the method comprising:
    processing a prescribed task with one or more of the plurality of processors including splitting the prescribed task into one or more subtasks, which are each processed on the one or more of the plurality of processors, wherein a first logical chain is formed for a duration of the processing of the prescribed task;
    transferring significant data relating to a processing state of the prescribed task from one of the plurality of processors arranged in a second logical chain to a next one of the plurality of processors arranged in the second logical chain, the second logical chain comprising the plurality of processors from the first logical chain; and
    loading back the significant data from the next one of the plurality of processors arranged in the second logical chain to the one of the plurality of processors arranged in the second logical chain when the one of plurality of processors fails and is restarted.

4. The method according to claim 3, further comprising the step of deleting the significant data in one of the plurality of processors in the second logical chain when processing of the prescribed task has ended in the next one of the plurality of processors in the second logical chain.

* * * * *